Aug. 10, 1926.
F. L. SIMMONS
COMPACT MAGNETIC CHUCK
Filed June 30, 1920
1,595,692
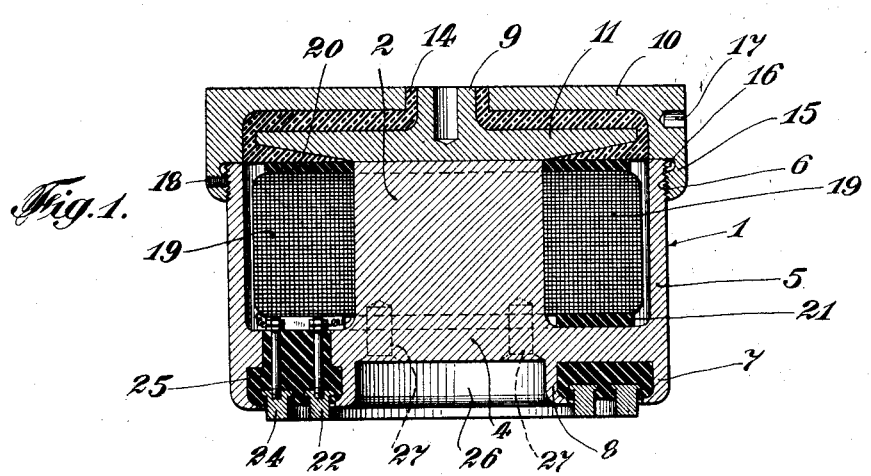
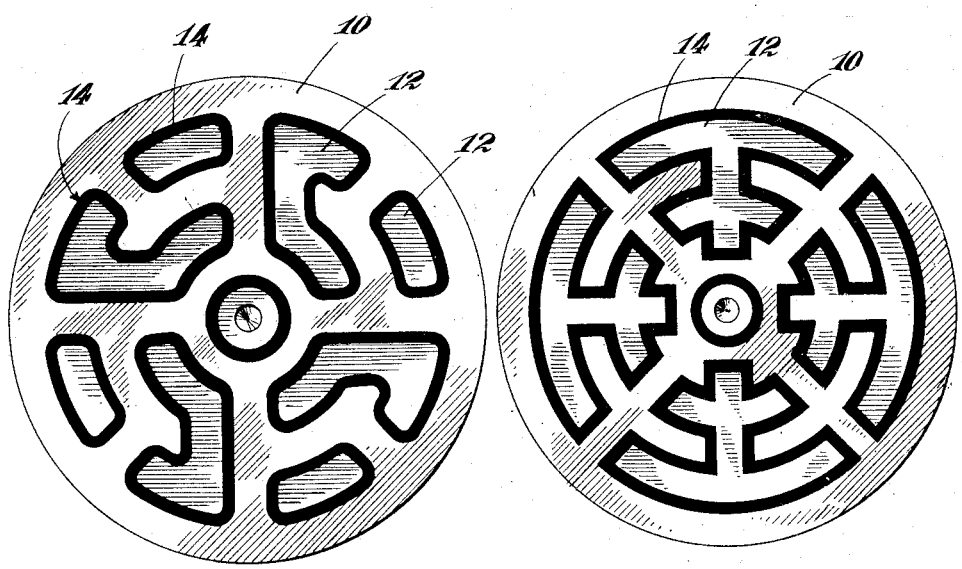
Fig. 1.
Fig. 2.
Fig. 3.
Inventor
Frank L. Simmons
By Attorney
George Ramsey Patented Aug. 10, 1926.

1,595,692

UNITED STATES PATENT OFFICE.

FRANK LEROY SIMMONS, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

COMPACT MAGNETIC CHUCK.

Application filed June 30, 1920. Serial No. 392,951.

The present invention relates broadly to electrical devices and more particularly to a magnetic chuck.

The principal object of the present invention is a compact magnetic chuck wherein the coil is securely held in place and the parts are assembled without individual assembly screws.

A further and important object of the present invention is a magnetic chuck having the contact members molded directly into a part of the body of the chuck.

A still further and important object of the present invention is a magnetic chuck wherein the face plate is screw threaded to the body wall of the chuck or to the housing for the energizing coil, and clamps the coil in place.

A further and important object of the present invention is the arrangement of face plate pole pieces in such manner as to produce a plurality of individualized areas by means of two pole piece members, one of which is supported on the shell, and the other of which is supported upon a central core pole.

Other and further objects of the present invention will in part be obvious and will in part be pointed out hereinafter by reference to the accompanying drawings wherein like parts are represented by like characters throughout the several figures thereof.

Realizing that the present invention may be embodied in constructions other than those specifically shown, it is desired that the specific disclosure herewith shall be considered as illustrative and not in the limiting sense.

Figure 1 is a sectional view illustrating a chuck embodying the present invention;

Figure 2 is a view of one form of face plate embodying the present invention;

Figure 3 is a view of a different form of face plate also embodying the present invention.

Heretofore in the art of magnetic chucks it has been customary to assemble the chucks by means of screws passed through the body wall of the chuck. In certain forms these screws have been inserted lengthwise through the side body walls and screw threaded into the top or face plate, thereby locking the parts together. In such constructions where the side walls of the chuck form a part of the magnetic circuit the magnetic paths are not uniform in the side walls in view of the fact that where the screws pass through the side walls are not of uniform thickness. It is particularly desirable in a magnetic chuck to have the magnetic holding power uniform over the face of the chuck. Furthermore, such prior art constructions have required considerable fitting in that there is the necessity of coordinating the openings in the body of the chuck with those in the part to be secured, usually the face plate, and the assembly is of such nature that the parts are securely clamped together only at the points where the screws are seated. Magnetic chucks are frequently used to hold work on a grinding machine using a grinding fluid so that the chuck is submerged in liquid. It is very essential that all joints shall be perfectly tight to prevent any liquid from entering the body of the chuck. Where screw bolts have been used in assembling in the prior art in most cases there was but one single joint between the parts held together by the screw bolts and this joint was liable to leak.

It has also been the custom of the prior art to provide screw attached electric contact members which tend to work loose and break the contact. If the contact is broken the chuck immediately looses its holding power, the work is released, and there is the liability of the work being spoiled, as well as great liability of tool breakage.

It has also been customary in the prior art to arrange various types of pole piece forms, in most cases, without any special consideration concerning the metal mass adjacent the pole pieces. In order to maintain a uniform field it is particularly desirable that the width of the magnetizable metal mass at the work face shall be approximately equal on the various pole pieces in order to maintain a uniform field, and it is also particularly desirable that the lines separating the pole pieces shall be disposed at substantially right angles to the forces to which the work will be subjected when on the face plate. In a rotary chuck it is, therefore, desirable to have certain lines arranged circumferentially of the chuck to resist centrifugal forces tending to throw the work from the chuck face, which forces act radially, and it is also desirable that certain lines shall be radial lines in order to resist circumferential forces established in the work by the action of the cutting member or tool while the chuck is rotating. Where the chuck is made up of a detachable face plate and a central core piece and a concentric surrounding wall, one of which comprises one core pole and the other of which comprises the other core pole, it is particularly desirable that the face plate be constructed in such manner that one group of poles is sustained by the central core piece and the other group of poles is sustained by the wall whereby the body of the chuck completely sustains all forces presented at right angles to the face of the chuck. This prevents any tendency of the pole piece members to loosen one from the other.

The present invention overcomes the difficulties of the known art by providing a very simple magnetic chuck which may be embodied in a cylindrical body having an upstanding central core pole piece adapted to be surrounded by an energizing member which may comprise one or more coils or insulated conductors. The face plate is secured to the body portion without the use of individual screw bolts and may be attached to the body portion by means of screw threads on the face plate member and on the body portion. This construction provides for at least two independent seals at the joint between the body portion and the face plate so that such construction is easily waterproofed. The face plate preferably is comprised of two pole piece members, one of which is provided with openings through which projections from the other pole piece member extend, with non-magnetic material separating the pole pieces one from the other and with a portion of the openings being concentric with the axis of the face plate and another portion being radial. This resists both the radial and circumferential forces to which work on a rotary chuck is usually subjected. The body wall of the chuck, preferably at the back, may be provided with a retention member such as a groove for the contact devices. Preferably the contact rings are set in position and then moldable insulating material is positioned in the groove and around the bases of the contact rings so that the contact member is molded directly into the body portion of the chuck and is therefore very securely attached to the chuck and there is practically no possibility of such member becoming loosened. While various insulating compounds may be used, preferably the compound employed is a phenol condensation product such as bakelite or condensite.

Referring now to the drawings, one embodiment of the present invention comprises a chuck having a body portion 1 which preferably is cylindrical in form and is provided with a central cylindrical core 2, which may be integral with the back wall 4 which carries the side wall 5. The side wall may be screw threaded as at 6 and the back wall preferably is provided with concentric ribs 7 and 8 which are undercut to provide retention for the contact ring base. The face plate 9 preferably comprises a plurality of pole piece members which may be two in number, such as 10 and 11. The pole piece member 10 is provided with a plurality of openings through which projections 12 from the pole piece member 11 extend. The pole pieces 10 and 11 are spaced apart and the space is filled with non-magnetic material 14 which magnetically insulates one pole piece from the other and which separates the projections 12 on the pole piece 11 from the side walls of the openings in the pole piece 10, thereby providing a plurality of magnetically separated areas to constitute differently magnetized pole pieces at the work face of the chuck. The non-magnetic material presents closed geometric figures on the work surface of the face plate with a portion of each figure being substantially concentric to the axis of the chuck and another portion being substantially radial to this axis. This form tends to create magnetic zones that resist movement of the work across the magnetic lines so that the work is held against both radial and circumferential forces. In Figure 2 the figures are made up of isolated segments of concentric rings, with certain of the segments tied together by substantially radial bars. In Figure 3 the geometric figures are likewise made up of isolated segments of concentric rings with the radial members bisecting the ring portions. Preferably the pole piece 10 is provided with an extension 15 which is screw threaded to engage the screw threads 6 on the side wall 5. This extension 15 may be undercut as at 16 to facilitate the threading operation and also to provide an accurate seat between the under side of the pole piece 10 and the end or edge of the side wall 5. Furthermore, the undercut groove 16 may be utilized for retaining a suitable gasket where a very secure seal is desired. The face plate may be provided with openings 17 for the reception of a spanner wrench or similar device so that the face plate may be securely seated against the body wall by means of the screw threads. This construction it will be observed provides a double seal for the joints between the face plate and the body in that the screw thread portion forms a side seal and the end of the side wall and the end of the pole piece 10 forms a top seal. Furthermore, in view of the fact that the screw threads are continuous around the side of the chuck, the sealing forces are substantially uniform on all parts so that a very accurate and secure joint is attained. In order to prevent any possibility of the face plate unscrewing a stub screw such as 18 may be seated through the extension 15 against the side wall 5. A suitable energizing coil or coils 19 is securely mounted in position on the central core 2 and may be supported by insulating washers 20 and 21, which are securely clamped in place against the coil when the face plate is screwed into place. A suitable opening is provided in the back wall of the chuck between the concentric ribs 7 and 8. The contact rings 22 and 24 are positioned between the ribs 7 and 8 and the terminals of the coil 19 are brought through the said opening and connected with the contact rings. The groove formed between the undercut concentric ribs 7 and 8 and the opening through which the contacts extend is then filled with molded insulating material, for example, a phenol condensation product such as bakelite or condensite and the contact rings are, therefore, molded directly into position in the insulating base 25 which is securely held between the undercut ribs 7 and 8. The back of the chuck is recessed as at 26 and provided with stub screw openings 27 which are adapted to receive stub screws to secure the chuck in position on the head of a suitable machine such as a grinder or the like.

From the foregoing it will be noted that the present chuck comprises an exceedingly compact rigid construction adapted to withstand severe usage without injury to the chuck and because of the fact there is but a single joint in the shell of the chuck, which joint is double sealed, the chuck is admirably adapted for wet grinding or like work where the chuck is submerged in liquid.

Having thus described my invention, what I claim is:

1. In a magnetic chuck, the combination of a body portion forming a receptacle for electromagnetic means, electromagnetic means within the body portion, a face plate adapted to cooperate with the body portion to seal the body portion and to clamp said electromagnetic means securely in place, and a screw threaded connection operatively connecting the face plate with the body portion.

2. In a magnetic chuck, the combination of a body portion forming a receptacle for electromagnetic means, electromagnetic means within the body portion, a core post in the center of the body portion, a face plate contacting with the post and adapted to cooperate with the body portion to seal the body portion, and a screw threaded connection operatively connecting the face plate with the body portion, said face plate comprising a series of pole pieces cooperating with said post and a complementary pole piece supported by the edge of the body portion.

3. A magnetic chuck comprising a hollow body portion, a central post integral with the body portion, electromagnetic means comprising a coil surrounding the post within said body portion, and a work-face provided with a plurality of pole pieces separated by non-magnetic material and adapted to be magnetized when the electromagnetic means is energized, said pole pieces being arranged into a series of pole pieces cooperating with said post and a pole piece supported by the body wall of the chuck.

4. In a magnetic chuck, the combination of a body portion, a pair of overhanging flanges on said body portion, collector rings between said flanges, and a moldable insulating body interlocked with said flanges and imbedding a portion of said rings whereby the collector unit is molded in position on the chuck.

5. In a magnetic chuck, the combination of a body portion, a pair of flanges on said body portion having inturned edges, collector rings between said flanges, and an insulating body molded into position between said flanges and retained in position by said inturned edges, and imbedding a portion of said rings whereby the collector unit is molded in position on the chuck.

6. In a magnetic chuck, electromagnetic means in combination with collector means comprising a plurality of collector rings, an annular moldable base in which a portion of said collector rings is imbedded, an annular anchoring means carried by the chuck and engaging the annular base throughout at least a substantial portion of its circumference to secure said base to the chuck.

7. In a magnetic chuck, an annular collector ring base, interlocking members carried by the chuck, with the sides of said collector ring base molded into engagement with said interlocking members, said interlocking members engaging said base annularly about its circumference, and a plurality of collector rings imbedded in said base, said base comprising a phenol condensation product.

8. A magnetic chuck, a body portion, electromagnetic means within the body portion, a collector ring unit, conductors for leading a suitable current to said electromagnetic means, said collector ring unit comprising an insulating base molded in position on the body portion, an integral extension on said base extending into the body portion and enclosing a portion of said conductors, and a plurality of collector rings carried by said base and connected to said conductors.

9. In a rotary magnetic chuck, a body portion forming a shell, a post in the center of said shell, electromagnetic energizing means, a face plate comprising two members, one of which is adapted to be energized to comprise one pole, the other of which is adapted to be energized to comprise an opposite pole, one of said members being provided with openings, projections on the other member adapted to extend through said openings, nonmagnetic material separating one of said members from the other and separating said projections from the edges of said openings, the outline of said nonmagnetic material at the work face of the face plate comprising closed geometric figures with a portion of each figure being concentric to the axis of the chuck and another portion being substantially radial to the axis of the chuck, a screw threaded joint between the face plate and the body portion, one of said members being supported by said post and the other of said members being supported on the shell of the body.

10. A magnetic chuck comprising in combination a body portion, electromagnetic means for energizing said body portion when said means are energized by a suitable electric current, a face plate having parallel sides and comprising two pole piece members non-integral with said body portion, one of said pole piece members being provided with openings, the other of said pole piece members being provided with projections extending through said openings, and nonmagnetic material separating said pole piece members and forming closed geometric figures at the work face of the face plate, and with the base for said projections extending beneath a portion of the pole piece member provided with the openings.

11. A face plate for a magnetic chuck having substantially parallel sides and comprising two pole piece members, one of said pole piece members being provided with openings, the other of said pole piece members being provided with projections extending through said openings, and with said projections on a common base extending beneath a portion of the pole piece member provided with the openings, and nonmagnetic material separating said pole piece members and forming closed geometric figures at the work face of the face plate.

12. A face plate for a magnetic chuck having parallel sides and comprising pole piece members, one of said pole piece members being provided with openings, another of said pole piece members being provided with projections mounted upon a common base and extending under a portion of said other pole piece and through said openings, and nonmagnetic material separating said pole piece members and forming closed geometric figures at the work face of the face plate, with the width of the magnetic material measured across adjacent poles being substantially equal.

FRANK LEROY SIMMONS.